(12) United States Patent
Thean et al.

(10) Patent No.: US 6,397,036 B1
(45) Date of Patent: May 28, 2002

(54) SYSTEMS, METHODS AND COMPUTER PROGRAM PRODUCTS FOR COLLABORATIVE LEARNING

(75) Inventors: Patrick S. Thean; William C. Whitley, both of Charlotte, NC (US)

(73) Assignee: MindBlazer, Inc., Charlotte, NC (US)

( * ) Notice: Subject to any disclaimer, the term of this patent is extended or adjusted under 35 U.S.C. 154(b) by 0 days.

(21) Appl. No.: 09/643,404

(22) Filed: Aug. 22, 2000

Related U.S. Application Data

(60) Provisional application No. 60/150,223, filed on Aug. 23, 1999.

(51) Int. Cl.[7] .............................. G09B 5/10; G09B 5/14
(52) U.S. Cl. ....................... 434/350; 434/322; 345/716
(58) Field of Search ................................ 434/322–350, 434/118; 345/733, 751, 156

(56) References Cited

U.S. PATENT DOCUMENTS

| | | | |
|---|---|---|---|
| 5,295,836 A | * | 3/1994 | Ryu et al. ............... 434/335 |
| 5,303,042 A | * | 4/1994 | Lewis et al. .............. 348/14 |
| 5,310,349 A | * | 5/1994 | Daniels et al. ............ 434/350 |
| 6,064,856 A | * | 5/2000 | Lee et al. ................. 434/350 |
| 6,074,216 A | * | 6/2000 | Cueto .................... 434/322 |
| 6,149,441 A | * | 11/2000 | Pellegrino et al. ........ 434/350 |
| 6,155,840 A | * | 12/2000 | Sallette ................. 434/323 |
| 6,287,125 B1 | * | 9/2001 | Dorcely ................. 434/323 |

* cited by examiner

Primary Examiner—Joe H. Cheng
Assistant Examiner—Kathleen M Christman
(74) Attorney, Agent, or Firm—Alston & Bird LLP

(57) ABSTRACT

A collaborative learning system, method and computer program product permits live, real time interaction between the audience and a presenter in a controlled learning environment. The collaborative learning system, method and computer program product provides a learning process that facilitates the transfer of expertise and knowledge using "push" technology. The system includes a presenter subsystem, a backbone subsystem and an audience subsystem. The process includes pre-event, event and post-event stages. During the pre-event stage, content is created and optimized, and the producer "coaches" the presenter. During the event stage, the presenter and the producer, using the presenter subsystem, push the event material to the audience located remotely at the audience subsystem via the backbone subsystem. The event materials may comprise slides, streaming audio/video and interactive answers to questions and responses to audience feedback. During the post-event stage, follow-up materials are prepared and presented to the audience, case studies are analyzed and the results are presented to the audience, and the event and related documents are "chunked" and archived for later retrieval on demand via a microsite.

20 Claims, 18 Drawing Sheets

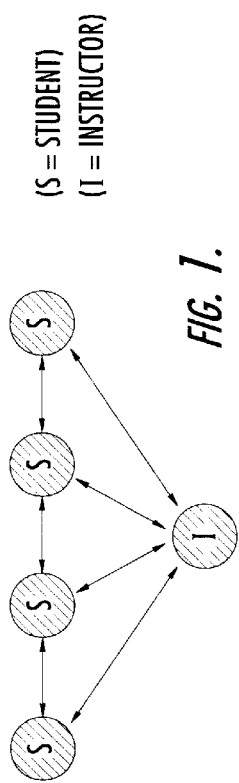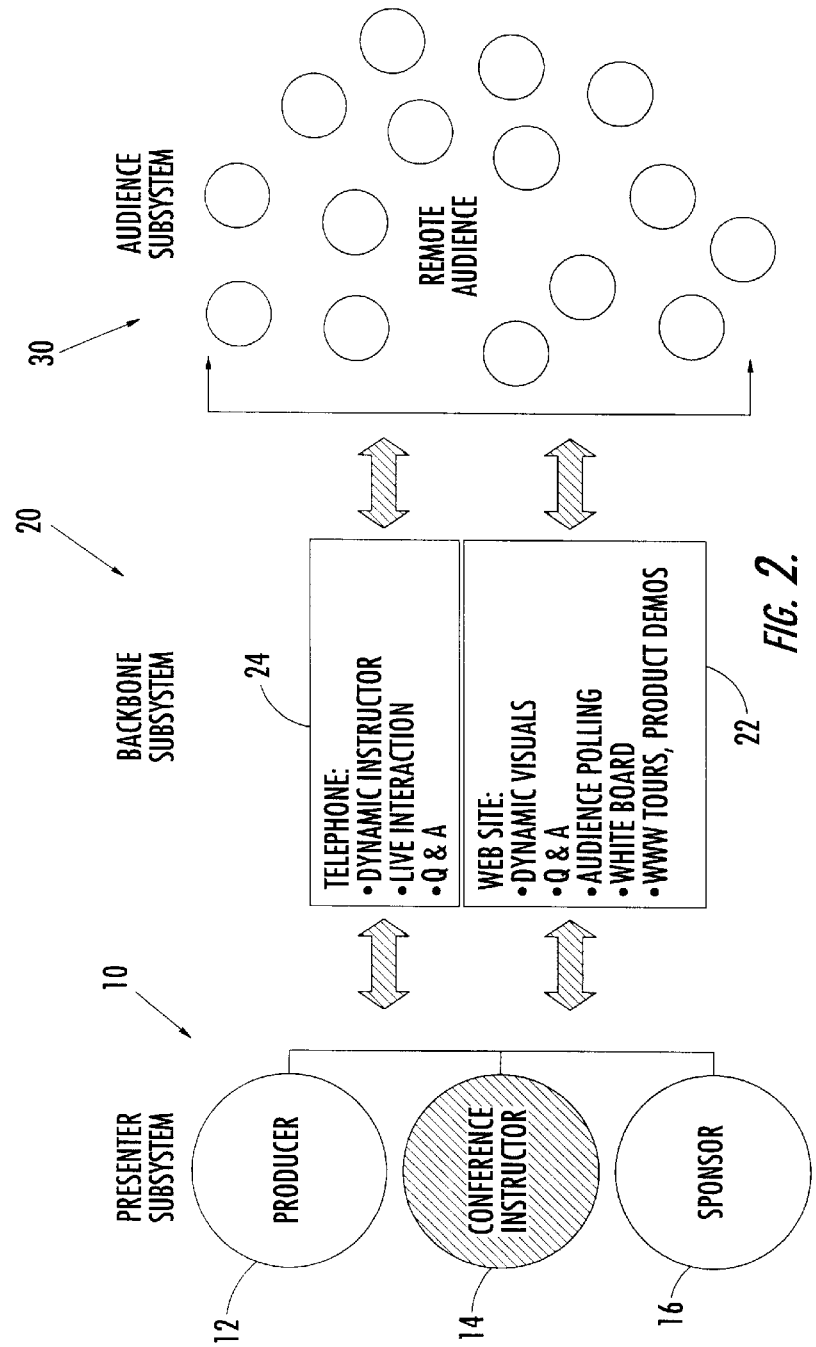

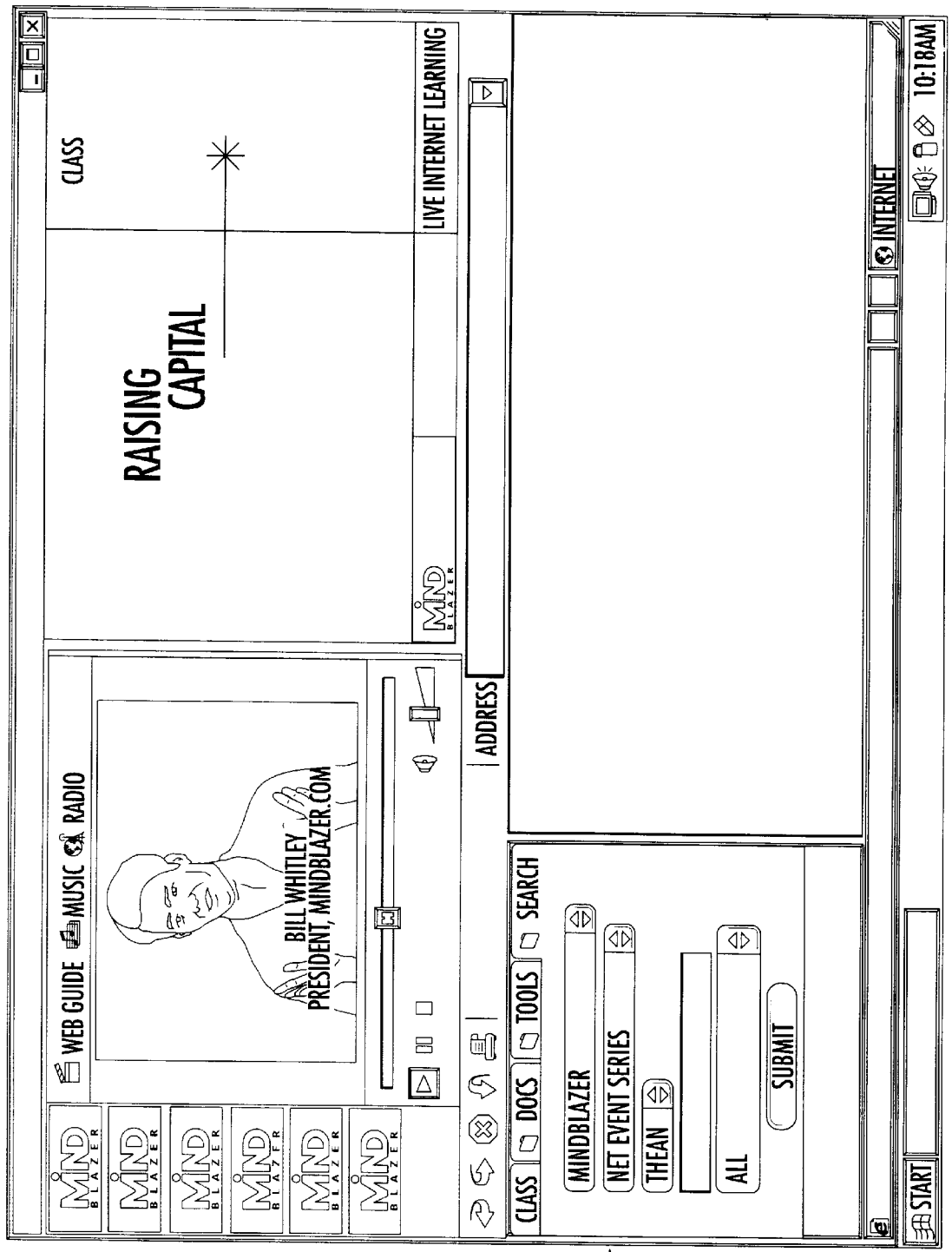

SYSTEMS, METHODS AND COMPUTER PROGRAM PRODUCTS FOR COLLABORATIVE LEARNING

This application claims the benefit of U.S. Provisional Application No. 60/150,223, filed Aug. 23, 1999.

FIELD OF THE INVENTION

This invention relates to systems, methods and computer program products used for learning, and more particularly, to systems, methods and computer program products used to increase the effectiveness of collaborative learning.

BACKGROUND OF THE INVENTION

Traditionally, training of employees and others occurred in a classroom setting. Trainers, instructors and presenters (collectively "presenter") utilized various equipment, including chalkboards, overhead projectors and even computers that interact with overhead projectors, for delivering training sessions and other presentations (e.g. lectures, continuing education and sales presentations) to an audience. The audience typically is located in the same room as the presenter. The advantage of this situation is that it permits interaction between the presenter and the audience. The disadvantage, on the other hand, is that it requires either the audience or the presenter to travel to the location of the training session which requires the attendees or their employers to incur the cost of travel to the presentation location as well as the loss of productive time due to the travel.

More recently, training and other presentations have taken place over "closed circuit" television to remote audiences. In this situation, the audiences are located in a different location, even a different city, than the presenter. The presenter presents the visual and audio portions in the form of a lecture which is broadcast over closed circuit television to the various audiences located remotely from the presenter. Training and other presentation materials, in certain circumstances, may be forwarded to the remote locations in advance of the session such that the materials are handed out to the audience at the beginning of the session. As a result, the audience can refer to the training materials as the presenter delivers the training lecture on the closed circuit broadcast. The advantage of the closed circuit television session is that it avoids the expense and loss of productive time associated with the attendees traveling to the location of the session. On the other hand, in the closed circuit session, interaction between the audience and the presenter typically is nonexistent.

In recent years, with the advent of the Internet and the world wide web, systems used in training and other presentations have improved dramatically. These new training systems have not only increased the effectiveness of the learning experience but, at the same time, have decreased the cost of delivering the sessions as well as decreased the cost to attendees in attending the sessions. The materials can be presented to the audience utilizing the world wide web. In this environment, the presenter is located remotely from the audience. The audience may be located in a single location remote from the instructor or the audience may be located at multiple locations with a single person located at each of the multiple audience locations. The presenter interacts with the audience via the Internet.

Alternatively, the presenter can interact with the audience over a combination of the world wide web and telephone. In this instance, the training materials are distributed to the audience and accessed by the audience via the world wide web while the audio portion of the training event takes place via a telephone conference call either with or without the assistance of an operator. As a result, the audience can view the presentation materials over the world wide web while carrying on a conversation with the presenter via the telephone.

In this environment, the presenter utilizes software available from one or more vendors, such as, for example, a software "tool" marketed by Placeware, a software "tool" marketed by Contigo, or a software "tool" available from Web Ex, to prepare the presentation materials.

It also is possible for presenters to utilize another entity to provide the presentation software such as that available from Placeware, Contigo or Web Ex and a telephone operator to implement the training event. As a result, the conference call provider provides the software as well as the operator assisted telephone conference call capabilities in addition to the visual presentation in presenting the seminar to the audience which is remotely located from the presenter.

Unfortunately, the prior art systems do not provide the flexibility or the ability to transfer the information, expertise and knowledge in such a manner to improve the learning experience. For example, the audience may not be able to retain all of the information, expertise and knowledge dispensed during the learning event.

SUMMARY OF THE INVENTION

It is, therefore, an object of the present invention to provide a collaborative learning system, method and computer program product.

It is another object of the present invention to provide a collaborative learning system for enhancing the learning experience.

It is a further object of the invention to provide a collaborative learning system that can be archived and easily accessed for enhancing the learning experience.

These and other objects are provided according to the present invention by a collaborative learning system which executes on a computer network system utilizing the world wide web and the telephone network. The collaborative learning system comprises a number of modules including a pre-event module, an event module and a post-event module. The pre-event module prepares the learning materials for the event for delivery by a presenter over the backbone system to an audience which is located remotely from the presenter. The event is designed and the content, including the learning materials, for the event is optimized by the pre-event module. The event content, which comprises audio content and visual content, is designed and optimized by the pre-event module. The pre-event module also "chunks" the content by categorizing and indexing the content to improve and optimize the content as well as to enhance the "on demand" accessibility of the content by the post-event module.

The event module delivers the event over a backbone system to the audience which is located remotely from the presenter. The backbone system comprises a telephone network for delivering the audio content and a computer network for delivering the visual content of the event. The visual content that is delivered by the event module includes streaming video and slides. In addition, the event module also receives questions from the audience, filters questions from the plurality of questions received from the audience, and presents the filtered questions to the presenter. The event module also provides the presenter's response to the questions either privately to one or more members of the audience or publicly to all members of the audience. Still further, the event module polls the audience as well as presents results of the polling to the audience. The questions received by the event module may be received by telephone, at a web site or via electronic mail.

The post-event module creates follow-up training materials and delivers the follow-up training materials to one or more members of the audience and also to other individuals or entities that were not members of the audience for the event. In addition, the post-event module also receives responses to the follow-up training materials from one or more members of the audience. The follow-up training materials may include case studies, an archived copy of the event which are created by encoding a video of the event and storing the encoded event video, and documents related to the event which also are stored in association with the encoded event video. The follow-up training materials are stored on a microsite which permits on demand access twenty-four hours a day, seven days a week, to the entire archived event as well as to "chunks," i.e., targeted portions, of the archived event.

BRIEF DESCRIPTION OF THE DRAWINGS

A preferred form of the invention is illustrated in the accompanying drawings, in which:

FIG. 1. is a block diagram illustrating the interaction between the audience participants (e.g., students) and the presenter (e.g., instructor) of the collaborative learning system, method and computer program product.

FIG. 2 is a block diagram of the collaborative learning system according to the present invention illustrating the presenter system or subsystem, the backbone system or subsystem and the audience system or subsystem;

FIGS. 12–13 and 14–20 illustrate two different embodiments of display screens that display elements of the event to the presenters and to the audience in relation to the event during the event and as archived according to the present invention.

DESCRIPTION OF THE PREFERRED EMBODIMENT

Figure 3:
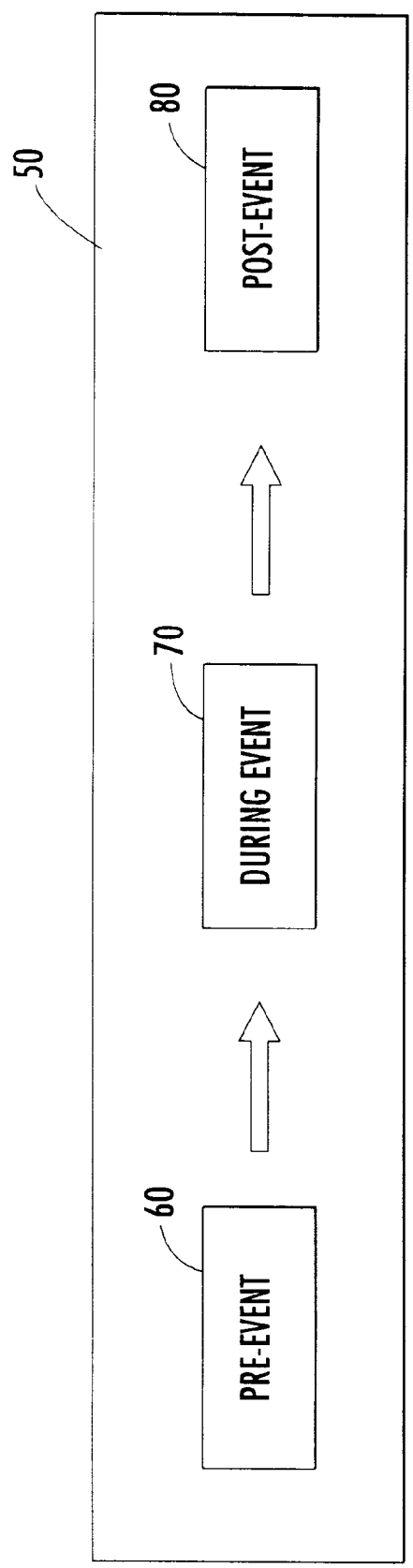
FIG. 3 is a high level block diagram illustrating the pre-event module, event module and post-event module of the present invention.

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Overview: Collaborative Learning System

The collaborative learning system according to the present invention provides a new and improved system, method and computer program product for improved collaborative learning. FIG. 1 is a block diagram illustrating the interaction between the audience participants (e.g., students or attendees) and the presenter (e.g., instructor) of the collaborative learning system, method and computer program product according to the present invention. As illustrated in FIG. 1, a single instructor can communicate with multiple students located at one or more locations. In addition, the students or attendees can communicate with one another.

Referring to FIG. 2, the architecture for the collaborative learning system according to the present invention will now be described. The architecture comprises presenter system or subsystem 10, backbone system or subsystem 20 and audience system or subsystem 30. The presenter subsystem 10 is located remote from the audience subsystem 30. The presenter subsystem 10 and the audience subsystem 30 communicate with one another over the backbone subsystem 20. The presenter subsystem 10 typically may have one or more processors, a data storage device, a display device and an input device. An instructor or presenter 12, and producer 14, use the presenter subsystem. A sponsor 16 also may use the presenter subsystem. In operation, the instructor 12 presents the materials using presenter subsystem 10 to the audience subsystem 30 via the backbone subsystem 20. The producer 14 acts as a "producer" of the event and facilitates the learning process from the presenter subsystem viewpoint, and enhances the teaching and also controls the collaborative learning environment. According to one embodiment of the invention, the presentation may be approximately ninety minutes in length followed by a sponsor demonstration of approximately ten minutes in length. It will be understood by those skilled in the art that the length of the presentation as well as the length of the sponsor demonstration may vary. Subsequent to the event, there may be an off-line discussion between the presenter and/or the producer, and the audience. In addition, the event, including the sponsor demonstration, may be archived or stored for later on demand retrieval and review by a user of the audience subsystem 30 or a person who is not physically present during the collaborative learning event.

The backbone subsystem 20 comprises a telephone conferencing facility 24, also referred to as a telephone communications connection, and a computer network (not shown), also referred to as a computer network connection, which is preferably the worldwide web, as well as a web site 22. All of these elements are accessible by both the presenter subsystem 10 and the audience subsystem 30. The web site 22 provides a platform for delivering dynamic visuals which may include slides or other visual presentation materials as well as audiovisual presentation materials in the form of streaming video. In addition, questions and answers also may be presented via the web site 22 as can audience polling, use of an electronic white board as well as worldwide web tours and product demonstrations. The telephone conferencing facility 24 of the backbone system 20 provides a platform for dynamic instruction with the live audience. The audio portion of the collaborative learning event, in the preferred embodiment, takes place over the telephone 24.

This portion of the collaborative learning event may also include interaction such as questions that may be presented by the remote audience and answers to the questions that are provided by the instructor. In the preferred embodiment, the questions are actually submitted to the presenter via the web site 22 and the answers are provided via the telephone 24. Nonetheless, it will be understood by those of skill in the art that questions and answers may be presented via one of, or both of, the web site 22 and the telephone 24. It also will be understood by those skilled in the art that the network used may be a single network combining both voice, which in the preferred embodiment using current technology is provided over the telephone 24, and video and data, which in the preferred embodiment using current technology are provided over the worldwide web. Still further, it will be understood that the network may be a private network, a public network or a combination of a private and public network.

Audience subsystem 30 comprises one or more audience locations. Each audience location may, for example, be a conference room, in which at least one audience member is present. The audience subsystem 30 typically may have one or more processors, a data storage device, a display device and an input device. A facilitator also may be present in each remote audience location to assist with the event from the audience subsystem 30 viewpoint. The audience facilitator assists with the audience in terms of setting up the connections with the presenter subsystem 10 via the backbone subsystem (e.g., over the worldwide web (not shown) and the telephone conferencing facility 24) and otherwise assists in managing the collaborative learning event from the audience subsystem perspective.

Through the architecture, audiences gain access to collaborative learning events. This process enables not just a live event and an archived event, but also events which improve the collaborative learning process and discussion.

As illustrated in FIG. 3, the collaborative learning system, method and computer program product 50 according to the present invention may be categorized into three components, namely, the pre-event module 60, event module 70 and post-event module 80. During pre-event 60, the producer and the presenter work in combination to prepare the presentation or learning materials to be used during the event. As part of this process, the producer helps to optimize the content and "coach" the presenter. In addition, instructions are provided to the facilitators that will be present at the audience subsystem during the event. The instructions relate to control of the audience subsystem during the event.

During event 70, the learning or presentation materials are delivered by the presenter. The learning or presentation materials may include lectures, audiovisual materials which may be delivered in the form of streaming video, web pages, visual materials in the form of slides or other images which are associated with, and coordinated with, the streaming video and audio. In the preferred embodiment, the audio portion of the event content is transmitted from the presenter subsystem 10 via the telephone portion 24 of the backbone subsystem 20. The visual portion of the event such as slides and streaming video is presented to the audience using "push" technology via the worldwide web (not shown) of the backbone system 20. The audience, using the audience subsystem 30, views the learning materials via web site 22 over the worldwide web. The association of, and coordination of, the slides and other audiovisual materials such as web pages, with the streaming video serves to improve and enhance the learning experience. The presenter may also use "white boarding" to assist in the presentation of the learning and presentation materials.

During event 70, the audience, using the audience subsystem, presents questions to the presenter. The questions may be presented over the Internet or the worldwide web 22. The producer, using the presenter subsystem 10, screens the questions and introduces acceptable questions to the presenter. In addition, the audience also may present questions to the producer using electronic mail or the telephone. The questions may request that the reply from the presenter be provided privately to the individual audience member or to all audience members located at a specific location or to all audience members participating in the event. In addition, the presenter can poll the audience and can even have a "chat" over the worldwide web with the audience while showing slides, streaming video or other content to the audience. As a result, in either embodiment, the present system permits live, real time interaction between the audience and the presenter in a controlled learning environment.

Alternatively, the audience may present questions to the facilitator, and the facilitator at the audience location may then submit the questions either by way of the telephone conferencing facility 24, electronic mail or the web site 22, who will receive the questions. At the end of the event, the producer 12, separate and apart from the presenter subsystem 10 and the backbone subsystem 20, can have a follow-up discussion with the remotely located audience.

Finally, during post-event 80, follow-up training materials and learning tools may be created and transmitted or delivered to the audience by the producer or the presenter using presenter subsystem 10. The training materials may include an archived copy of the collaborative learning event which is presented to the audience which participated in the live collaborative learning event or did not participate in the event, via web site 22. The follow-up training materials and learning tools, in addition to the archived learning event, also includes one or more actual examples of practical applications of the learnings presented by the presenter during the event, as well as business studies, case studies and success stories relating to the learnings as well as documents related to the event. The audience may respond to the request for case studies by way of electronic mail using the audience subsystem. During post-event 80, the producer and instructor conduct an analysis of the case studies received by the producer and instructor using the presenter subsystem 10 and deliver or transmit the results of the case studies using the presenter subsystem 10 to the audience 30. The audience receives the results of the case studies using the audience subsystem or may receive the results via electronic mail. The archived copy of the event includes a portion, or alternatively, all of the follow-up materials and other post-event materials.

Detailed Operation: Collaborative Learning System

Figure 4:
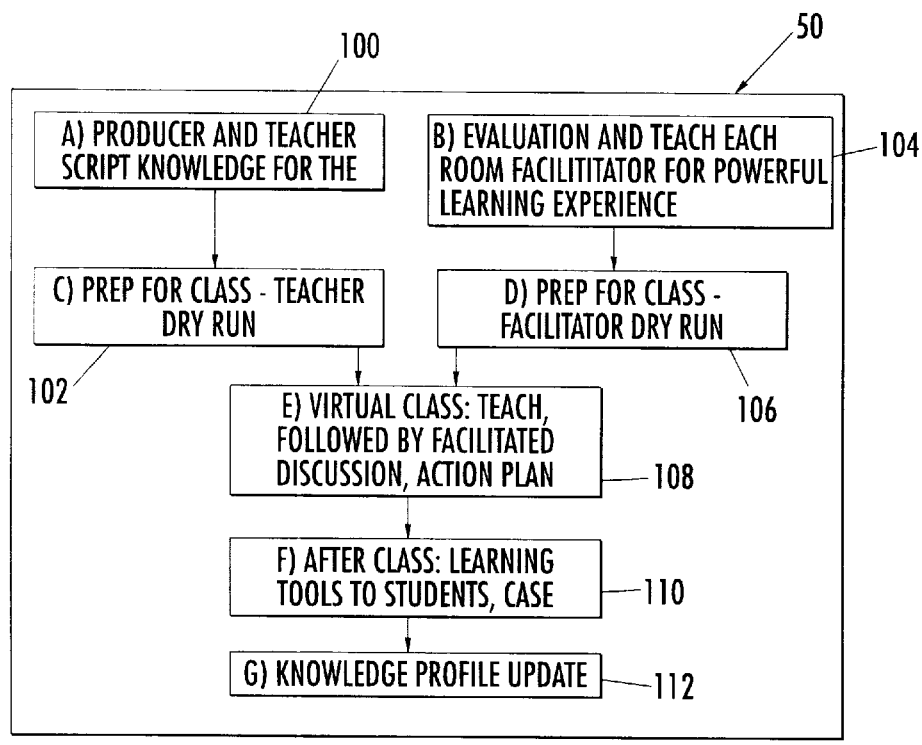
FIG. 4 is a flow chart illustrating the control provided by the pre-event, event and post-event modules according to the present invention.

Referring to FIG. 4, the collaborative learning system described generally with respect to FIGS. 1–4 will now be explained further. As illustrated in FIG. 4, in accordance with the pre-event module, the producer and the presenter (e.g., teacher) prepare the content (e.g., script of knowledge) for the event at block 100. In addition, the producer assists the teacher at 102 by helping to optimize the learning materials and content so that the learning event may provide the ultimate learning experience for the audience. Optimization of the learning materials and the content includes, for example, categorization and indexing and other "chunking" of materials as well as coaching of the instructor. The teacher or instructor may also conduct a number of "dry runs" at 102 to practice the live event.

In addition, facilitators, who will be located at the audience subsystem 30, are selected and provided instruction to enhance the learning experience at 104. Selection of the facilitators may include an evaluation process. These facilitators assist with the equipment at the audience subsystem 30 as well as distribution of written materials and even possibly, in one embodiment, the collection of questions and feedback to be provided to the presenter. The facilitator may also conduct a "dry run" at 106 to practice the event before it actually takes place.

During the event, the instructor presents the collaborative learning event at 108 with the assistance of the producer at the presenter subsystem 10 and the assistance of the facilitator located at the audience subsystems 30. The event may include not only the presentation of the materials but also live interaction, a question and answer period, audience polling, and sponsor product demonstrations.

After the live event has concluded, post-event or follow-up materials are created and provided to the audience that actually participated in the event at 110. In addition, individuals that did not attend the event may review the event via the web site during the post-event period. Finally, during the post-event, the instructor may analyze the results of the live event to improve the next live event to be presented by the instructor. The instructor may also prepare or request from the audience case studies of practical applications of the learnings from the event and publish the case studies to be presented to the attendees during the post-event period or publish the case studies via the web site in connection with the archived event which includes not only an encoded recorded video of the event, but also related documents, web browser capabilities and other features to enhance the learning experience.

Figure 5:
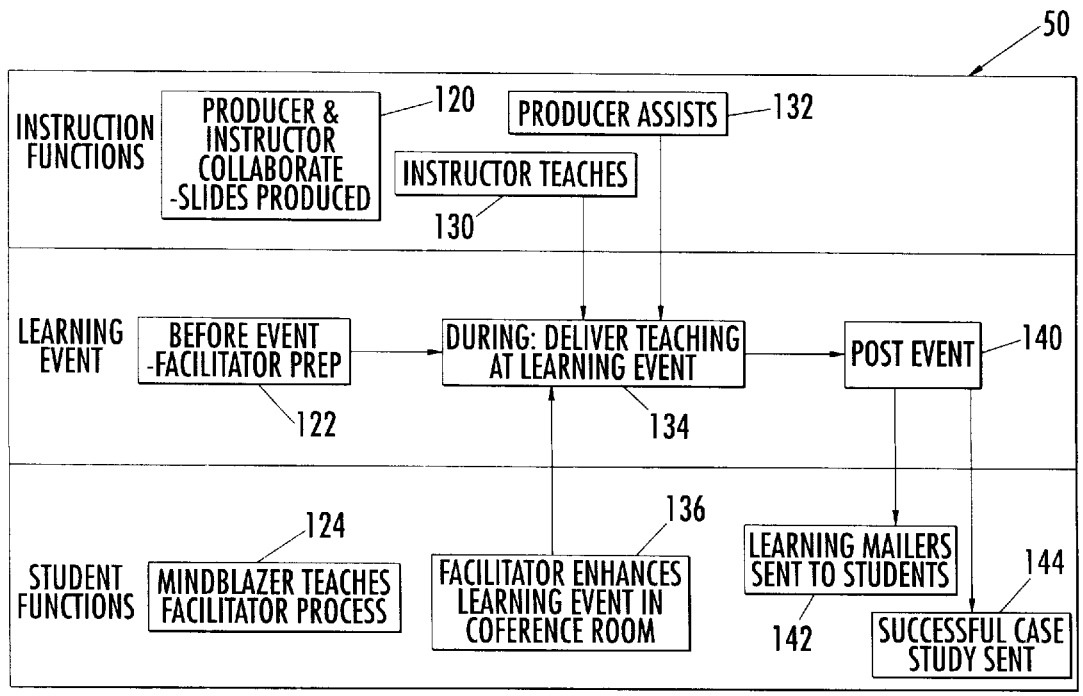
FIG. 5 is alternative block diagram illustrating the pre-event, event and post-event module operations illustrated in FIG. 4.

FIG. 5 illustrates a block diagram from a functional perspective of the collaborative learning system, method and computer program product described with respect to the pre-event, event and post-event module operations illustrated in FIG. 4. During pre-event 60 (see FIG. 3), the producer and instructor collaborate in preparing the content at 120, the facilitator is selected and prepared at 122 and 124. During the event 70, the instructor presents the content at 130 assisted by the producer at 132. The event is delivered at 134 to the audience and the facilitator at 136 enhances the learning event at the audience subsystem. Thereafter, during post-event 80 (see FIG. 3), post-event materials 140 including follow-up training materials and case studies may be presented to audience participants as well as individuals that were not present at 142 and 144. Those individuals that do not participate in the live event may use these follow-up materials when viewing the archived event.

Figure 6:
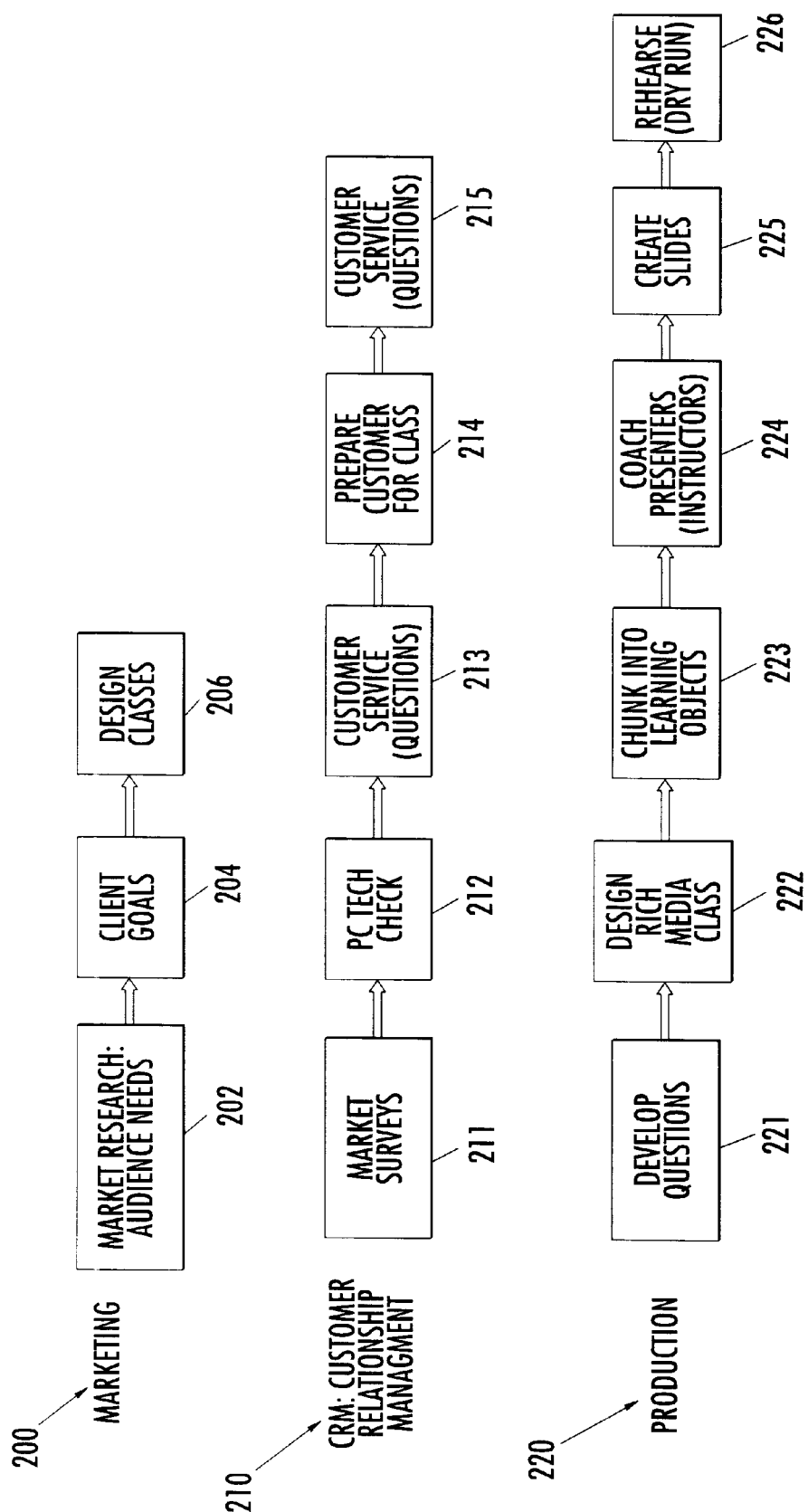
FIGS. 6–8 are block diagrams illustrating the operations of the pre-event, event and post-event modules, respectively, categorized into different perspectives/viewpoints according to the present invention.
Figure 7:
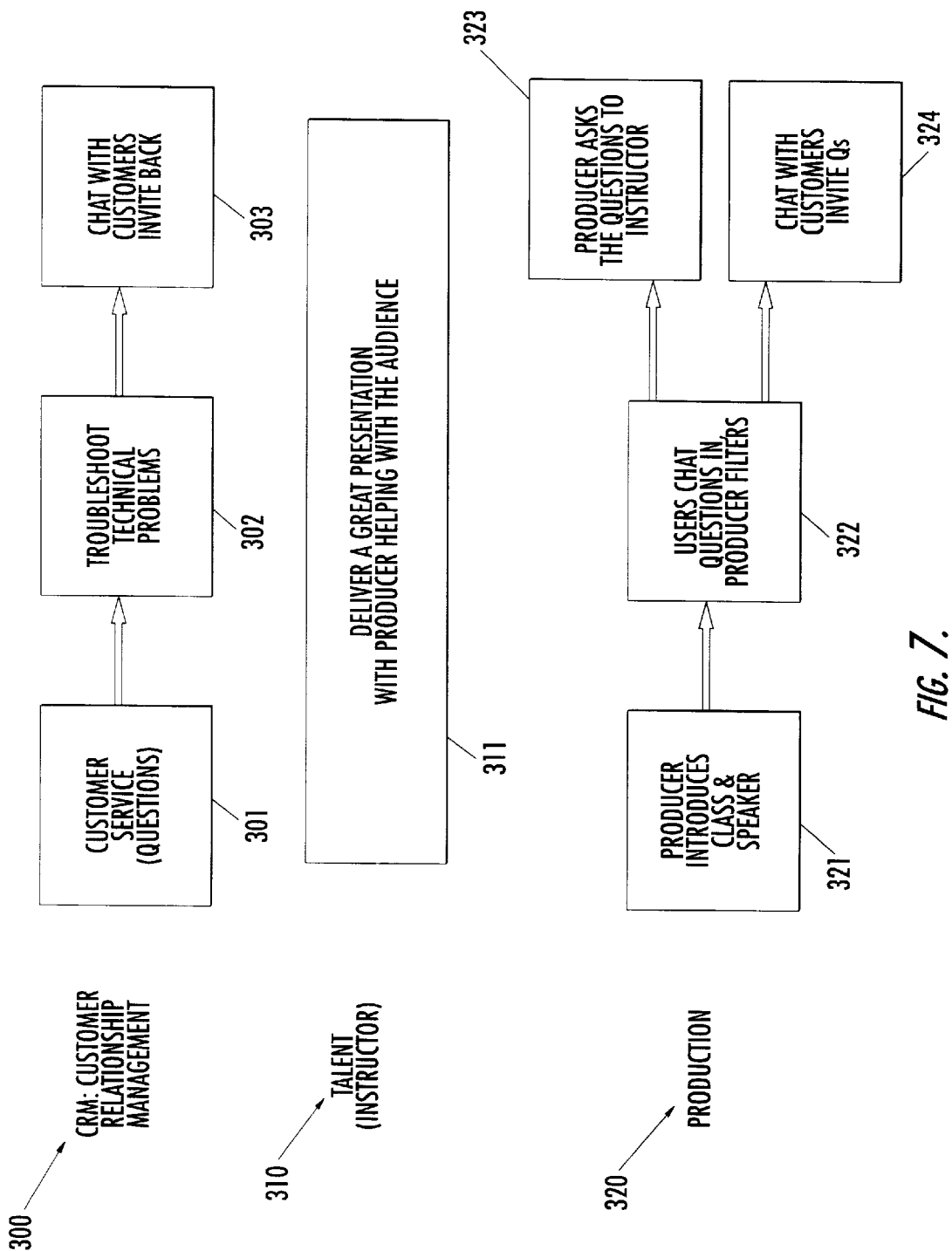
Figure 8:
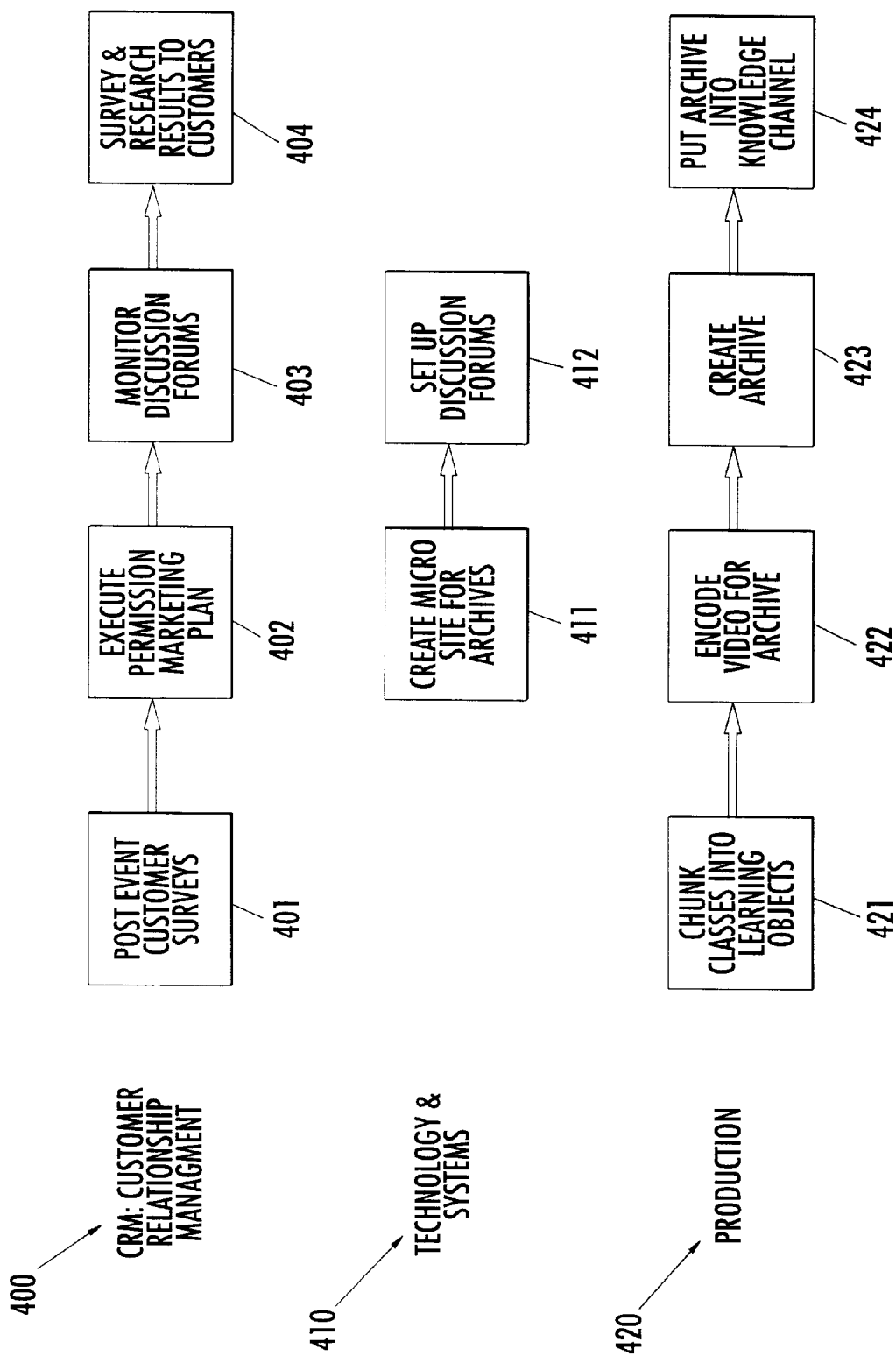

FIGS. 6, 7 and 8 provide an alternative illustration to the pre-event, event and post-event modules. FIG. 6 illustrates a further functional perspective of the pre-event module of collaborative learning system according to the present invention. In developing the content including optimizing the content, the development process includes marketing 200, customer relationship management 210 and production 220. Marketing 200 in the development process includes conducting market research at 202 to determine the needs or requirements of the audience that will be participating in the event or viewing the archived event. Once the audience needs have been determined, they are then analyzed in order to identify the goals of the client (e.g., the employer of the audience) at 204. Thereafter, the classes or content are actually developed at 206.

During this development process, it is also necessary to take into account customer relationship management. Customer relationship management 210 includes conducting market surveys so that you know your customer at 211. In addition, a hardware check at 212 must be made in order to insure that the client has the necessary hardware and software at the audience subsystem 30 (see FIG. 2) to support the event as well as the archived event. Customer service questions may be prepared at 213 and the customer may also be prepared for the event at 214. Following preparation of the customer for the event, additional customer questions may also be prepared at 215 in final preparation for use during the event.

The actual event content also is developed during the pre-event module. Questions (or goals) to be answered by the event are developed at 221 followed by designing of "rich media" at 222 for the event. "Rich media" includes video, audio, animation (including moving dynamic graphics and slides that "flip" in coordination with the video), and attention drawing interaction and colors. Thereafter, the content is "chunked" into learning objects at 223 to further facilitate the learning process. This "chunking" of the content is part of the content optimization process. In addition, this "chunking" also facilitates ease of retrieval of a portion of the archived copy of the event. Also during pre-event, the instructors are coached in their presentation to improve mannerisms and presentation style at 224 to enhance the learning environment provided by the event. Once the majority of the content has been prepared, the slides are finalized at 225, and a "dry run" of the event is conducted by the instructor and the facilitator at 226.

Referring to FIG. 7, an alternative illustration of the event module from a further functional perspective is provided. In delivering the event, the event preferably includes customer relationship management 300, talent (instructor delivery) 310 and production 320. As part of the customer relationship management 300, high quality customer service 301 is provided. Customer service includes receiving questions from the customer (i.e., client) or event participants at 301. In addition, any technical problems occurring during the event are attended to and fixed at 302. Finally, a "chat" session 303 may be held between the instructor at the presenter subsystem with the audience at the audience subsystem.

Talent or instructor delivery 310 is also crucial to the event delivery. The primary concern is delivering a high quality presentation 311. The producer or facilitator at the presenter subsystem supports the instructor in the delivery of the entire event in order to produce a high quality live collaborative learning event.

Finally, the delivery of the event includes the "production" component 320. The producer introduces the instructor to the audience and also the audience to the instructor at 321. The audience delivers questions to the producer either via e-mail or a chat session at 322. The producer filters these questions in order to select specific questions for the instructor from the larger group of questions presented by the audience to the producer. Once the producer has selected a question, the producer submits the question to the instructor at 323. In addition, the producer or the instructor continuously chats with the customers at 324 and also invites additional questions from the audience.

Referring to FIG. 8, the post-event module comprises customer relationship management 400, technology and systems 410, and production 420. Customer relationship management 400 provides surveying of the audience during the post-event period at 401. In addition, a marketing plan is executed at 402 with the permission of the customer in an effort for the presenter and/or sponsor to obtain valuable marketing information as well as marketing inroads. The permission marketing method helps to build relationships with prospective or existing customers. The relationship is initially built by offering the prospective customer something of value free of charge but with the permission of the prospective customer and then delivering the service that is offered. The results obtained seek to build the relationship while obtaining important information about the prospective customer. Thereafter, discussion forums and chats are monitored with the customers at 403. The presenter and the producer then analyze the results of the survey and the discussion forums and provide the results to the audience or the client (e.g., the employer of the audience) at 404.

During the post-event period, a number of technology and systems features are enabled at 410. For example, the event is archived for later retrieval. The archived event may be stored in a number of locations including on a microsite linked to one or more of the sponsor's web site, the instructor's or presenter's web site, or the client's (e.g., the audience's employer) web site at 411. In addition, discussion forums may also be set up in connection with the archived event at 412, which may be implemented through the microsite.

Finally, the post-event period also includes a production component 420. The producer (or the person or entity acting on behalf of the producer) "chunks" the event and/or events into learning objects at 421. This "chunking" process takes place at 421 during the post-event period; however, this process is facilitated in part by the optimization, including chunking, of the content that occurs during the pre-event period. The chunking of the event may be viewed, at least partially, as similar to breaking a book into chapters. This "chunking" process enables quick and efficient retrieval of digestible portions of the archived event. During the post-event period, the recorded live event is encoded for archiving. The recorded event may be in the form of an audiovisual recording which is then digitally encoded at 422. Also, additional materials such as the case studies and other follow-up and post-event materials are combined with the encoded recorded video of the event to create the archive at 423. Thereafter, the archived event is stored on a microsite or other web site at 424. As a result of the archiving of the event and related documents, the event as well as portions of the event may be easily retrieved, on demand, to reinforce learning that occurred during the event for event registrants or to allow other individuals that did not attend the event to either view the event in its entirety or to obtain specific information about specific portions of the event without requiring the review of the event in its entirety. The archived event may thus be searched, and is also linked to the web sites of one or more of the producer, the sponsor, the presenter and/or the client (e.g., the employer of the audience). This archived event as stored on a web site which is linked to other sites may be referred to as a "knowledge channel" (see 510 of FIG. 10). Thus, the archived event stores relevant "rich media" content including the encoded recorded event as well as related documents, other learning materials and even searching capabilities to display web pages and other content concurrently with the encoded recorded event. As a result of the "chunking," specific parts of the content may be targeted and quickly accessed, on demand, by members of the audience that participated in the event as well as individuals or entities that did not participate in the event.

Figure 9:
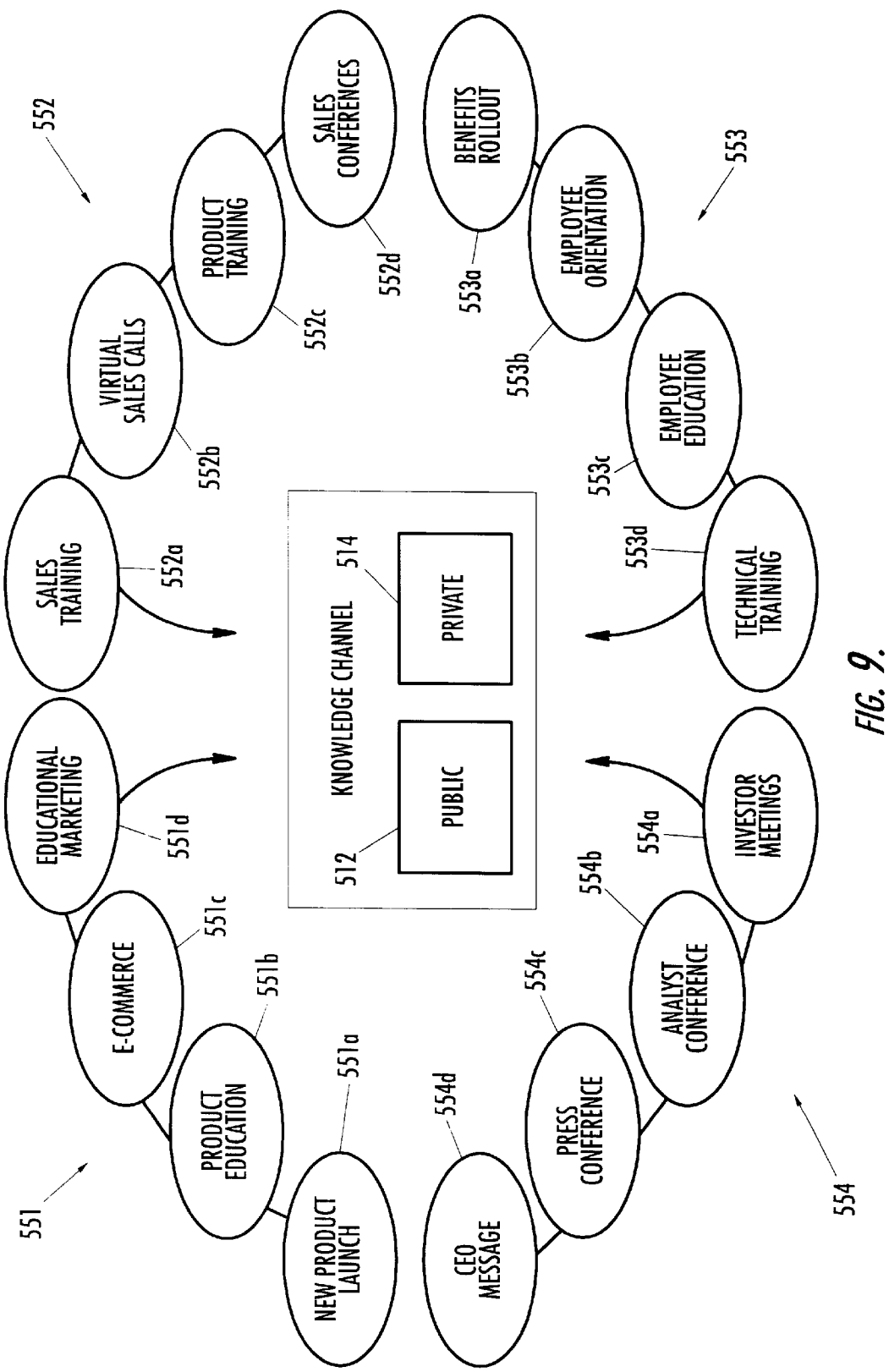
FIGS. 9 and 10 are high level block diagrams illustrating the archived event created by the post-event modules.
Figure 10:
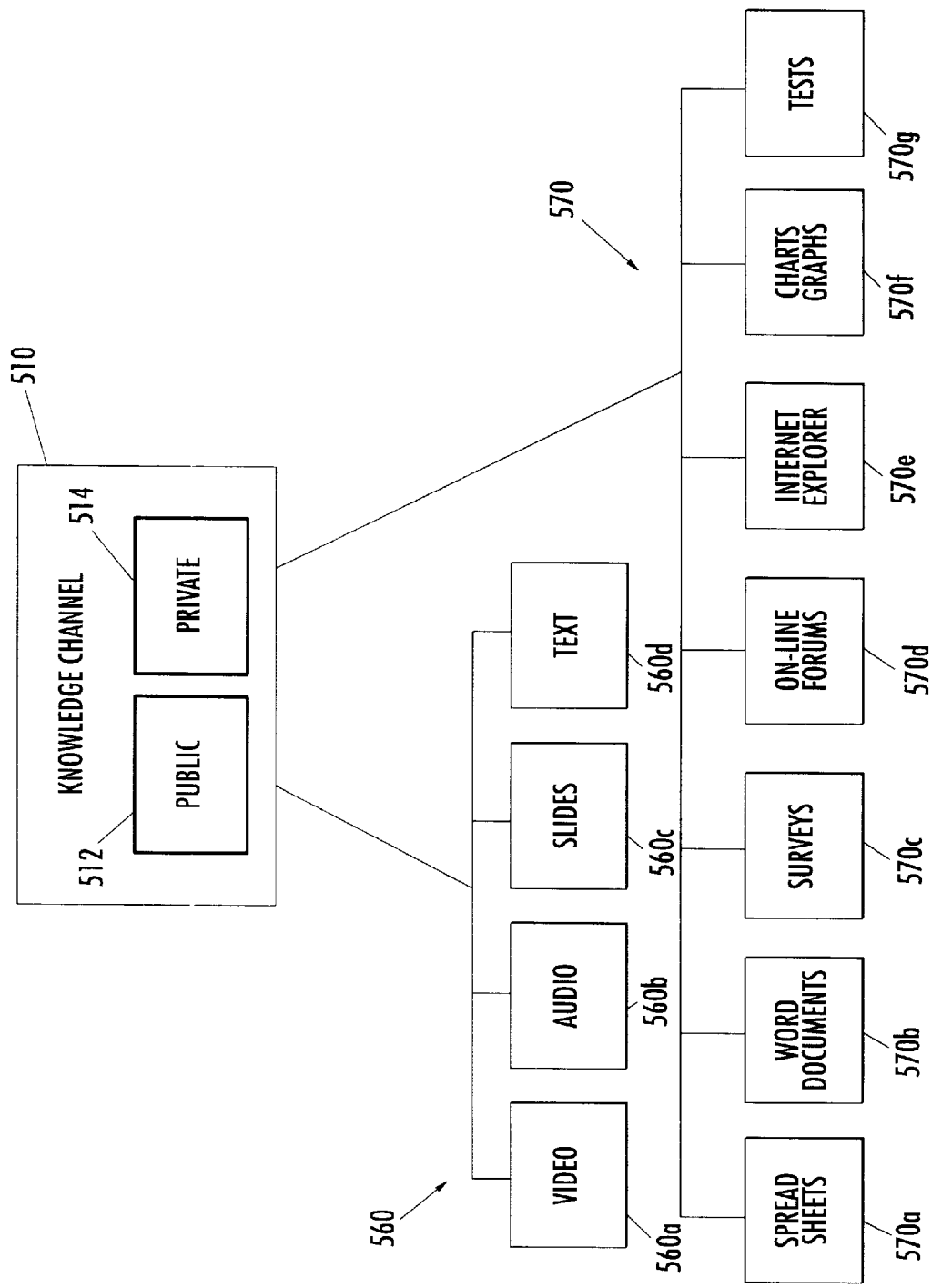

FIGS. 9 and 10 are block diagrams illustrating alternative embodiments for the archived event which are available on a microsite or other storage medium. As illustrated generally at 551, 552, 553 and 554, the event can take on a number of different forms or have a number of different purposes, and not just traditional training. For example, the event can be used for marketing as indicated generally at 551. Marketing includes, for example, new product launches, product education, electronic commerce and educational marketing as illustrated at 551*a*, 551*b*, 551*c* and 551*d*, respectively. In addition, the event can be produced for purposes of providing sales as generally illustrated at 552 and, more particularly, sales training 552*a*, virtual sales calls 552*b*, product training 552*c* or sales conferences 552*d*. Still further, the event can be used for training as illustrated generally at 553. In particular, training includes, for example, one or more of benefits rollout presentations, employee orientation sessions, employee education seminars, or technical training as illustrated at 553*a*, 553*b*, 553*c* and 553*d*, respectively. Finally, as another example of the applications for the event, the event can be used for corporate communications as illustrated generally at 554 and more particularly for dissemination of CEO messages, broadcasting of press conferences, analyst conferences, and even investor meetings as illustrated at 554*d*, 554*c*, 554*b* and 554*a*, respectively. These types of events, namely, marketing events illustrated at 551 generally, sales events illustrated at 552 generally, training events illustrated at 553 generally, and corporate communications events illustrated at 554 generally, can be produced and made available internally as illustrated at 514 of FIG. 10, i.e., privately within a client, or externally as illustrated at 512 of FIG. 10, on both a live as well as an archived basis.

FIG. 10 is a block diagram illustrating the types of formats and the types of related documents that comprise the archived event. The content contained in the archived event may take on one or more of a number of different formats. The event itself is archived as an encoded recording. As illustrated at 560*a*, this encoded recording is a video recording. The video recording contains audio and video of the entire event, including not only the streaming video of the instructor presenting the learning session, but also the audio of the event, the slides and the interaction between the audience and the presenter. The audio segment 560*b* also may be stored separately from the streaming video of the event to permit retrieval of only the audio portion of the event. In addition, the slides, separate and apart from the audio and streaming video, are associated with the microsite at 560*c* to permit an audience member or other individual to access on demand only the slide portion of the event. Finally, during the post-event period, a synopsis of the event is prepared and stored as text on the microsite as illustrated at 560*d*. Each type of content is "chunked" to permit easy, on demand retrieval. Each type of content may be accessed by an audience member that participated in the event or some other individual, separate and apart from the other types of content contained within the archived event stored on the microsite.

The related documents illustrated at 570 generally, which can be included in the archived event, also can take on a number of different types or formats. For example, the related documents which are stored as part of the archived event in connection with the video recording, audio recording, slides and text may be spreadsheets 570*a*, word documents 570*b*, surveys 570*c*, online forms 570*d*, web pages accessed through a web browser such as Internet Explorer at 570*e*, charts or graphs 570*f* and even tests 570*g*.

Figure 11:
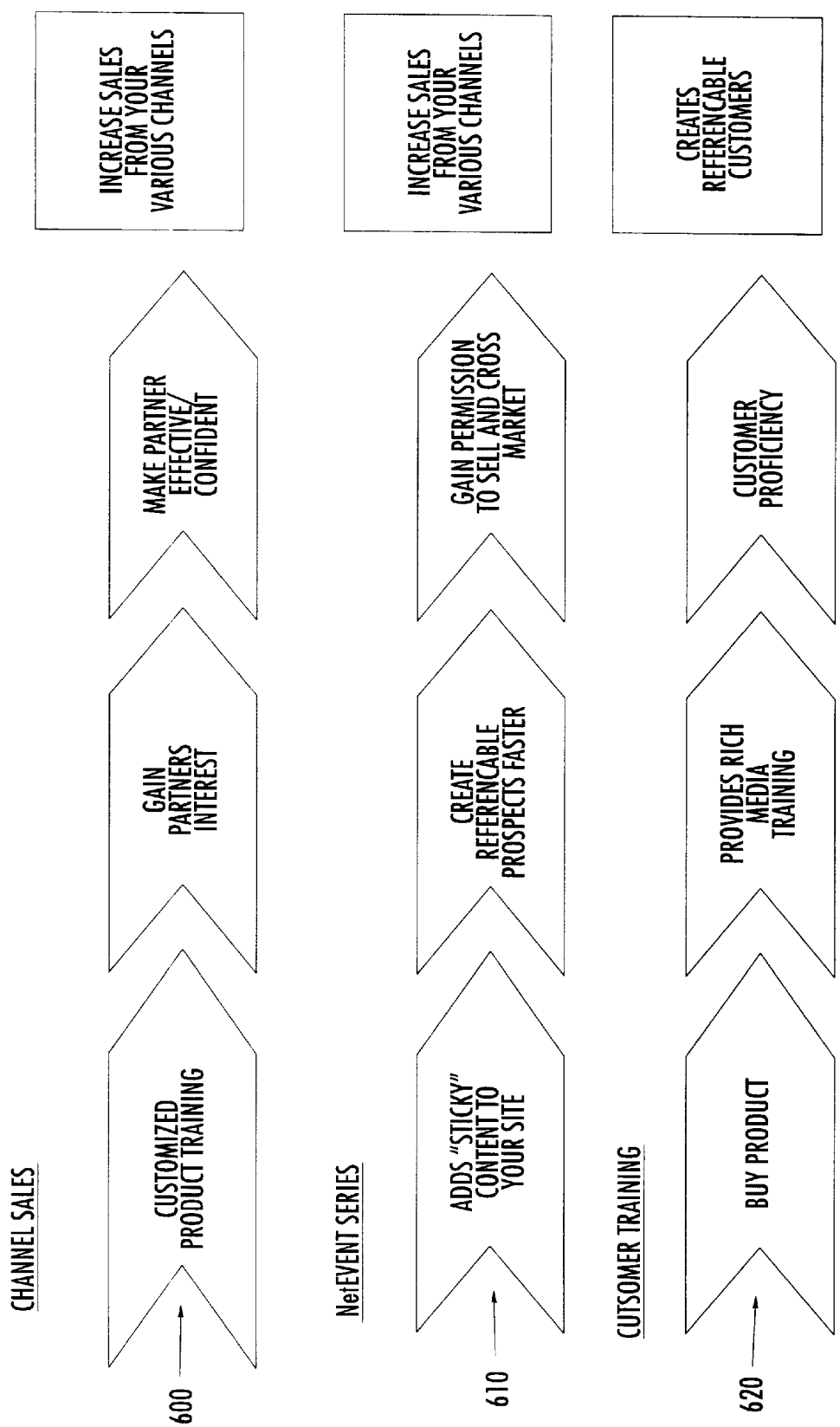
FIG. 11 is a block diagram illustrating exemplary applications and advantages for the present invention.

Referring now to FIG. 11, exemplary applications of the system, process and computer program products according to the present invention will now be described. For example, the present invention may be used to improve "channel sales" at 600. This is achieved by creating customized product training materials and other content during the pre-event period, which are then presented to the client's partners during the event and are followed up with the client during the post-event period. The use of the present invention will increase the interest of various partners as well as increase the effectiveness and confidence of the various partners which ultimately has the result of increasing the client's sales through its various channels. As a result, the invention may be used on a one-to-one basis with specific partners.

The present invention also may be used to provide a series of live events at 610. These live events contain "sticky" content which is added to the client's web site or a microsite that is affiliated and linked with the client's web site. The "sticky" content, which has been optimized during the pre-event period and chunked during the post-event period, and also contains related documentation that was added during the post-event period, creates a highly effective presentation that may be easily retrieved and reused, either in whole or in part. In addition, it enhances a client's ability to cross-market and cross-sell its products and services. As a result, the present invention will increase sales from various sales channels.

Finally, the system, method and computer program product according to the present invention may also be utilized in customer training 620. A customer may purchase either the live event or the archived event, which includes both the recorded live event plus additional content that has been "chunked" and categorized. This archived event, which may be available on the customer's web site or on a microsite which is linked to the customer's web site, provides "rich" media training for employees and representatives of the customer. The use of this "rich" media in training improves the customer's efficiency while at the same time provides the customer with an easily retrievable and reusable training tool.

Figure 12:
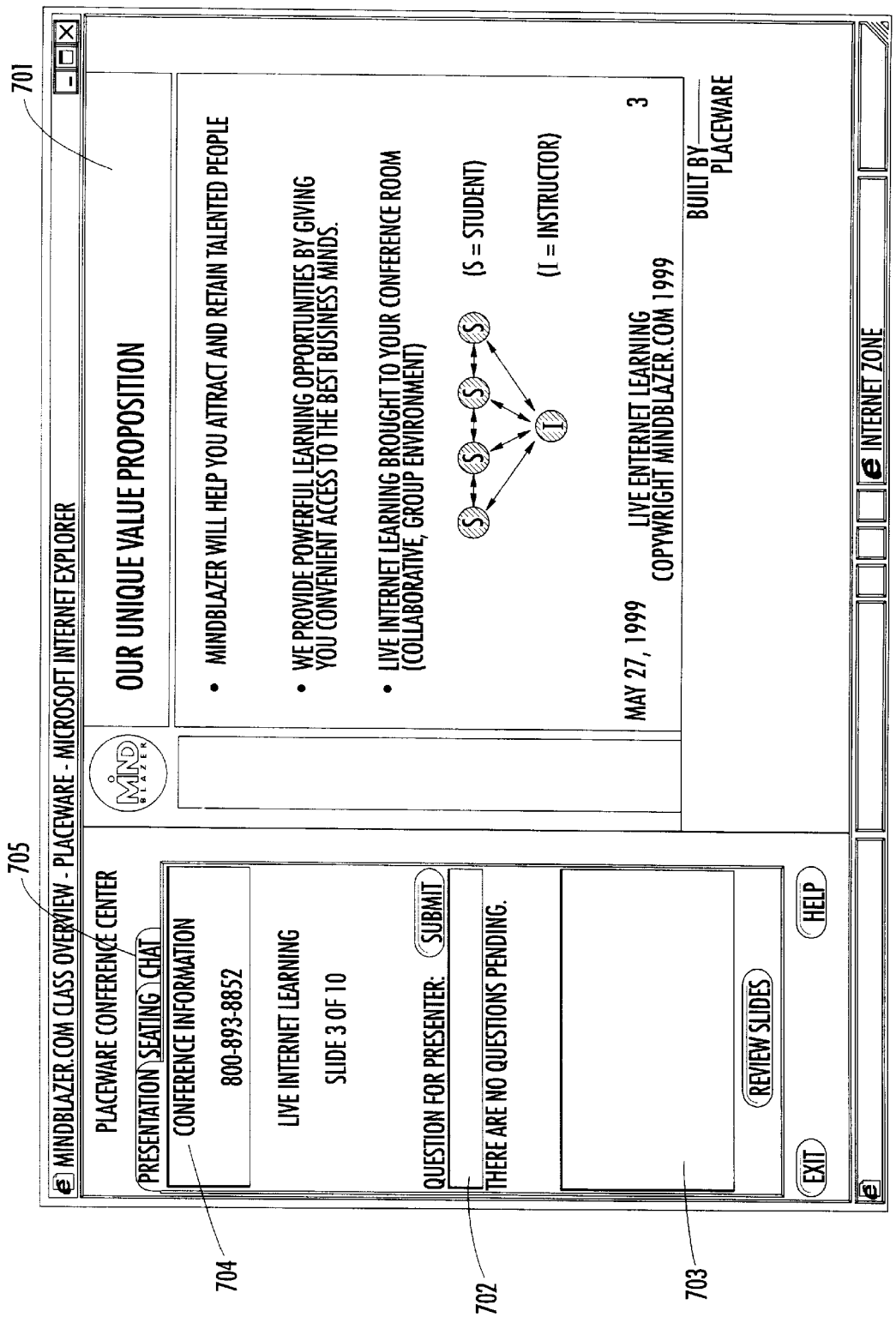
Figure 13:
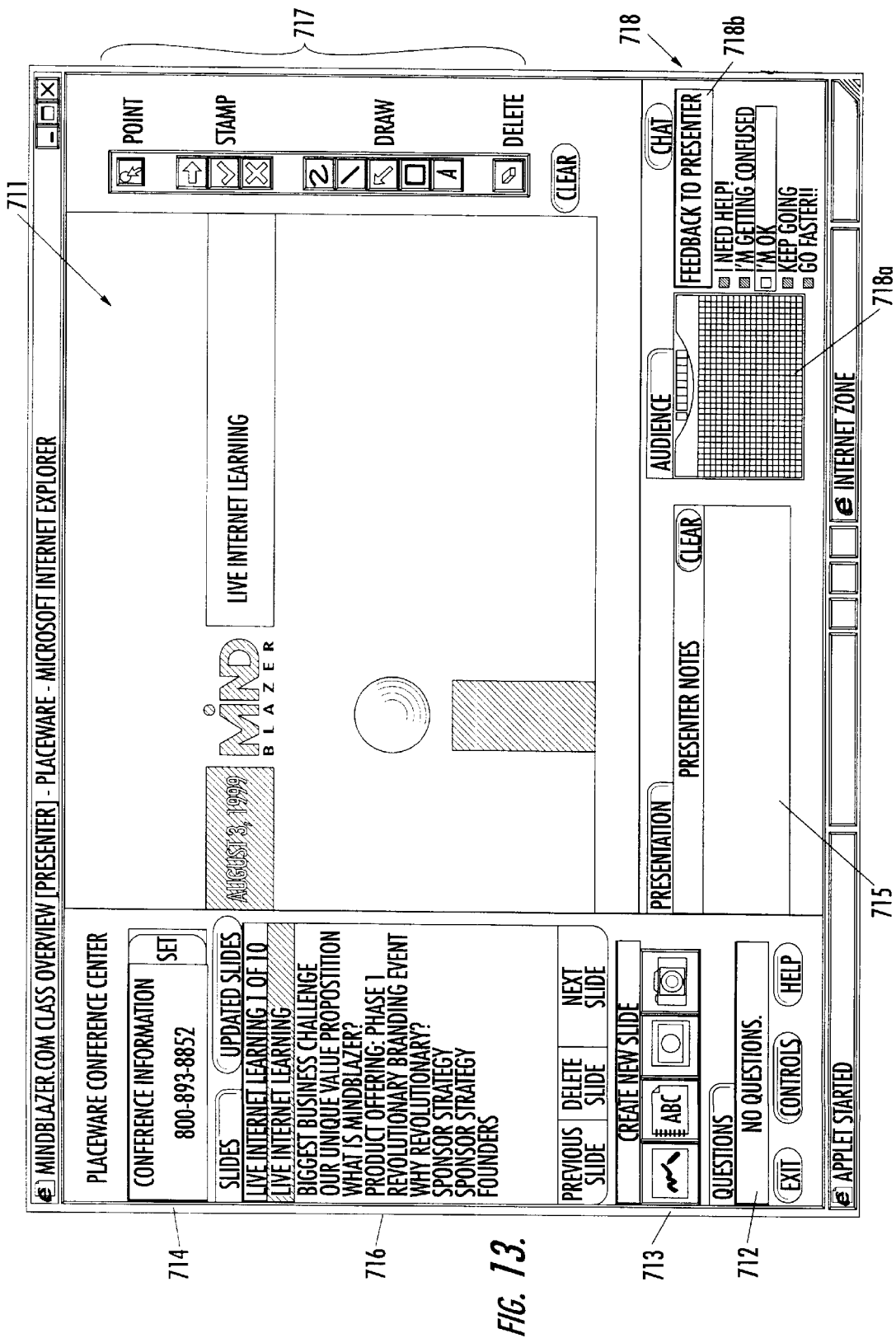
Figure 14:
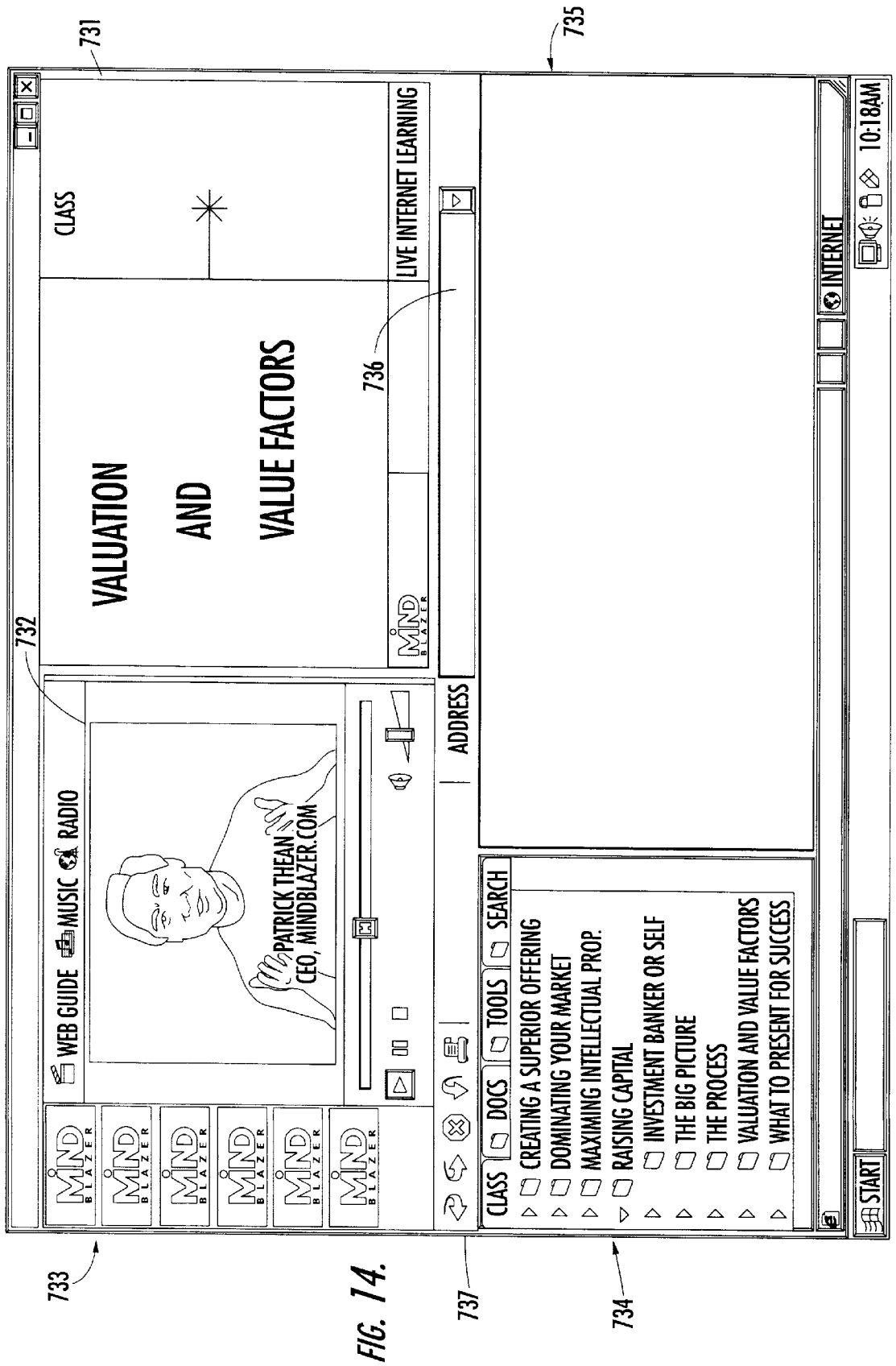

Referring now to FIGS. 12–20, various different options for presenting the event to the audience will now be described. FIGS. 12–20 illustrate a number of display screens that are created by the producer and presenter and delivered to the audience using the backbone system 20. These different display screens are categorized into two groups, namely, FIGS. 12–13 and FIGS. 14–20. FIGS. 12–13 illustrate one version of the event as displayed on a screen over the worldwide web or on a microsite. This display screen includes a number of areas. For example, the screen includes an area which displays a slide illustrated at 701. In addition, the screen displayed in FIG. 12, which is the screen display viewed by the audience, also includes an area for the audience to ask questions at 702 by typing in a question and then submitting the question to the presenter. As previously indicated, the question is actually submitted to the producer who then considers the questions and selects specific questions (e.g., filters the questions) from all of the questions submitted for presentation to the presenter or instructor. A listing of slides may also be displayed at 703. Finally, advertising and other information may be displayed at 704. In addition, the audience can select the "chat" command 705 and enter a "chat" session with the presenter.

FIG. 13 illustrates a display screen from the perspective of the presenter. A slide is displayed at 711 of FIG. 13. This slide can be modified or deleted and recreated from scratch using the command keys illustrated generally at 717. Similarly, the presenter and producer may also create new slides using the controls located at 713. In addition, the presenter can receive questions as illustrated at 712. Further, the presenter's notes are displayed at 715. The presenter can insert his notes as well as modify those notes and display those notes. The presenter also can have interactive chat sessions with the audience at 718. Various preset feedback responses such as "I Need Help!," "I'm Getting Confused," "I'm OK," "Keep Going," or "Go Faster!!" can be provided at 718*b* where a member of the audience can simply click on one of these feedback responses during a chat session during the event and this response is provided in real time to the presenter. In addition, the presenter can also poll the audience. The audience poll will be displayed in 718*a*. Still further, a listing of the slides is displayed to the presenter at 716. The presenter can scroll through this slide listing. Finally, a place is provided for other information regarding the conference as well as advertisements for the sponsors at 714.

Referring to FIGS. 14–20, another version of the display screen presented to the audience during the event as well as during the archived version of the event is illustrated. The display screen is segmented into areas. The slides are displayed at 731 in the top right-hand area. The encoded audio/video recording of the event is displayed at 732 in the top middle of the display screen. Advertisements and other logos of sponsors and presenters as well as links to other web sites or brand partner may be displayed in the top left area of the display screen at 733. A number of tabs are provided in the lower left area at 734 which provide options for displaying a list of classes, documents or tools or a search template. In the example displayed in FIG. 14, the classes contained in the archived event are listed in the bottom left area. The user may select any one of these classes, which will result in the archived revision of the class being run on the microsite. A web browser is also provided in the bottom right quadrant at 735. The audience may view web pages or other documents in this quadrant. A user of the microsite may enter an address in the address block at 736 to access the particular web site. In addition, typical browser keys including forward, backward, stop and printer are provided to the microsite user at 737.

Figure 15:
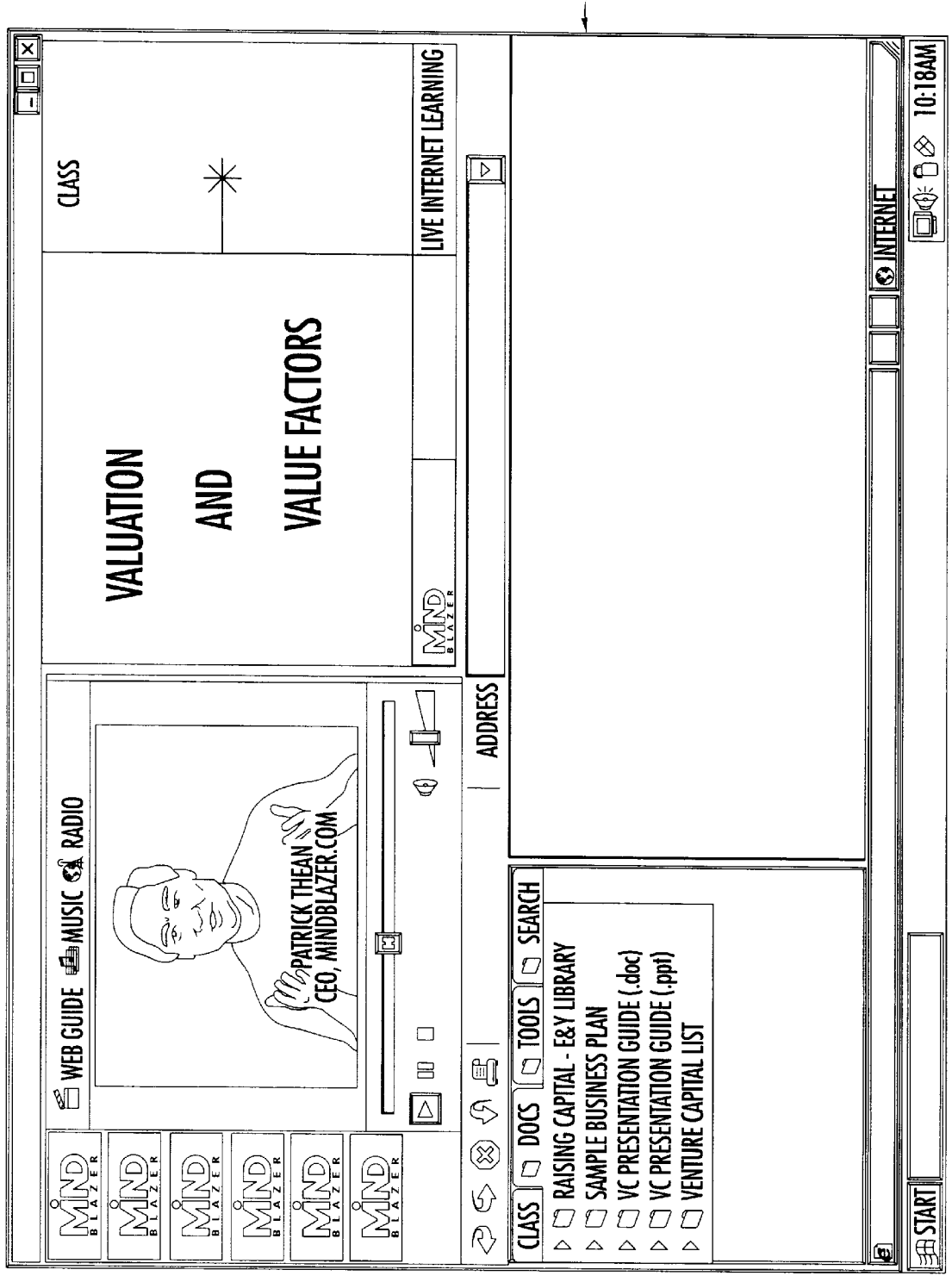
Figure 16:
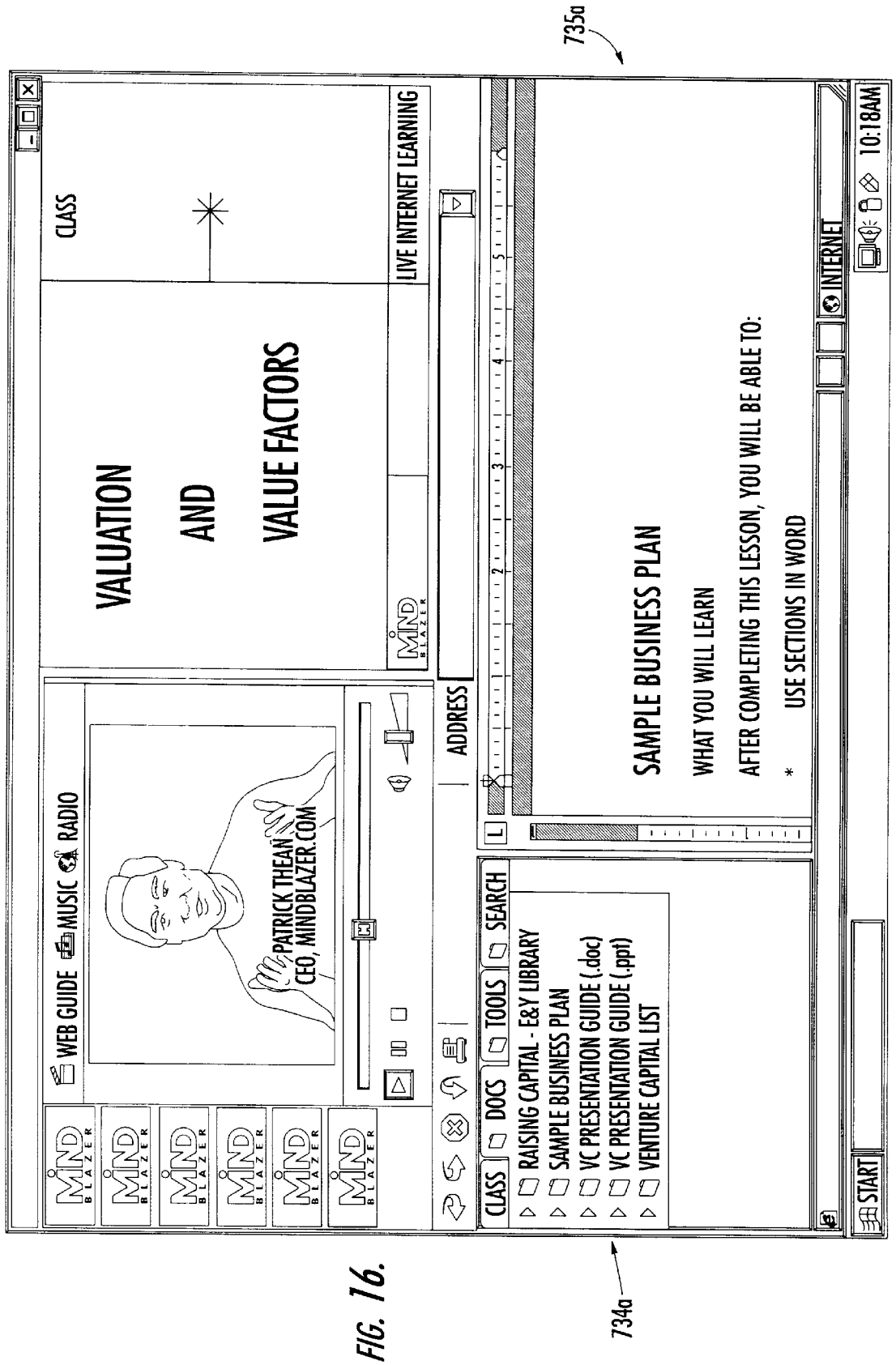

FIG. 15 illustrates a display screen with the "Docs" tab having been selected at 734*a*. The user can select a particular document contained in the list of documents and cause this document to be displayed in area 735 during access to the microsite. FIG. 16 illustrates the display screen when a user has selected the "Sample Business Plan" document from those listed at 734*a*. As a result, the "Sample Business Plan" document is disclosed to the user at 735*a* on the display screen.

Figure 17:
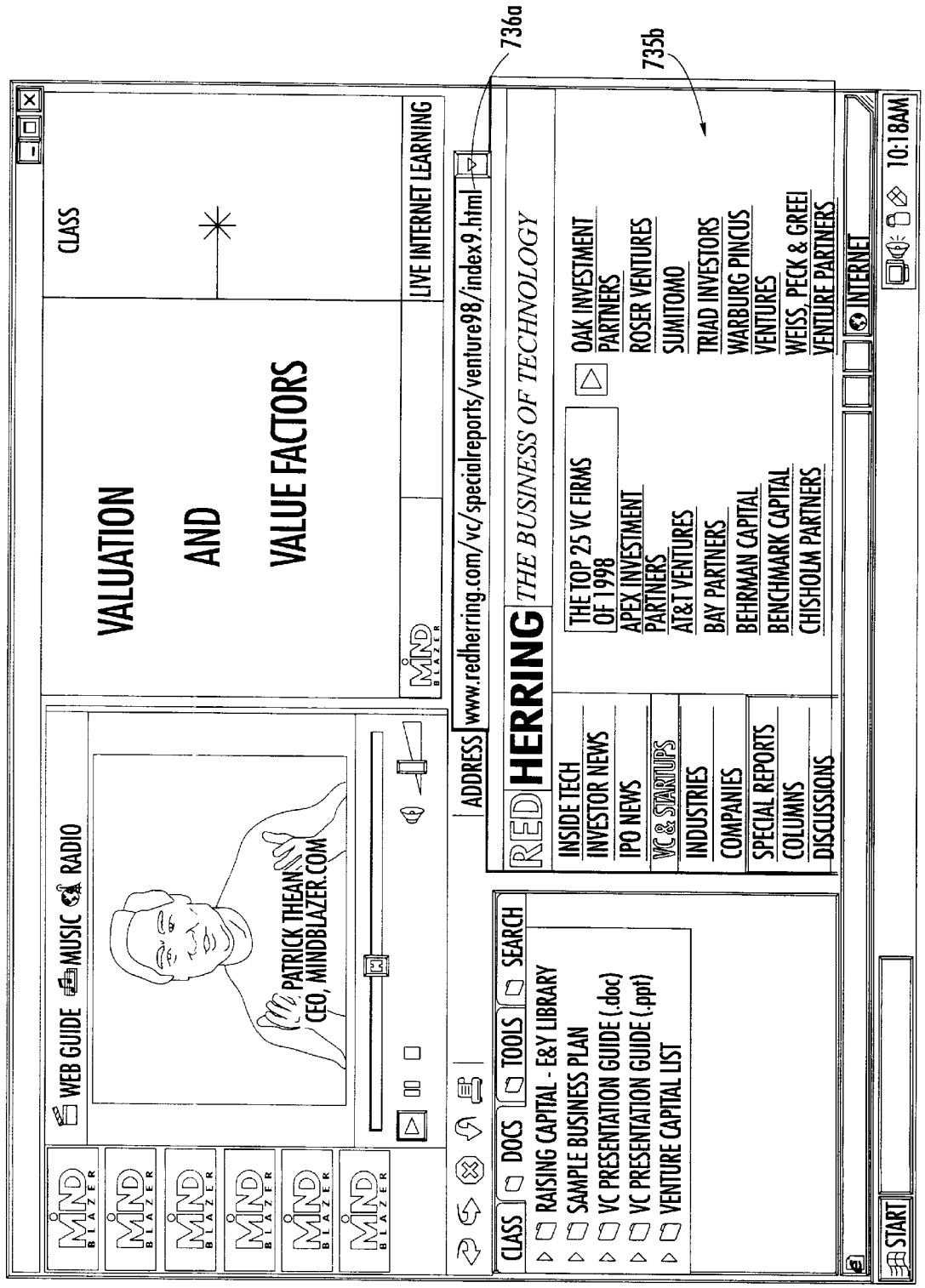
Figure 18:
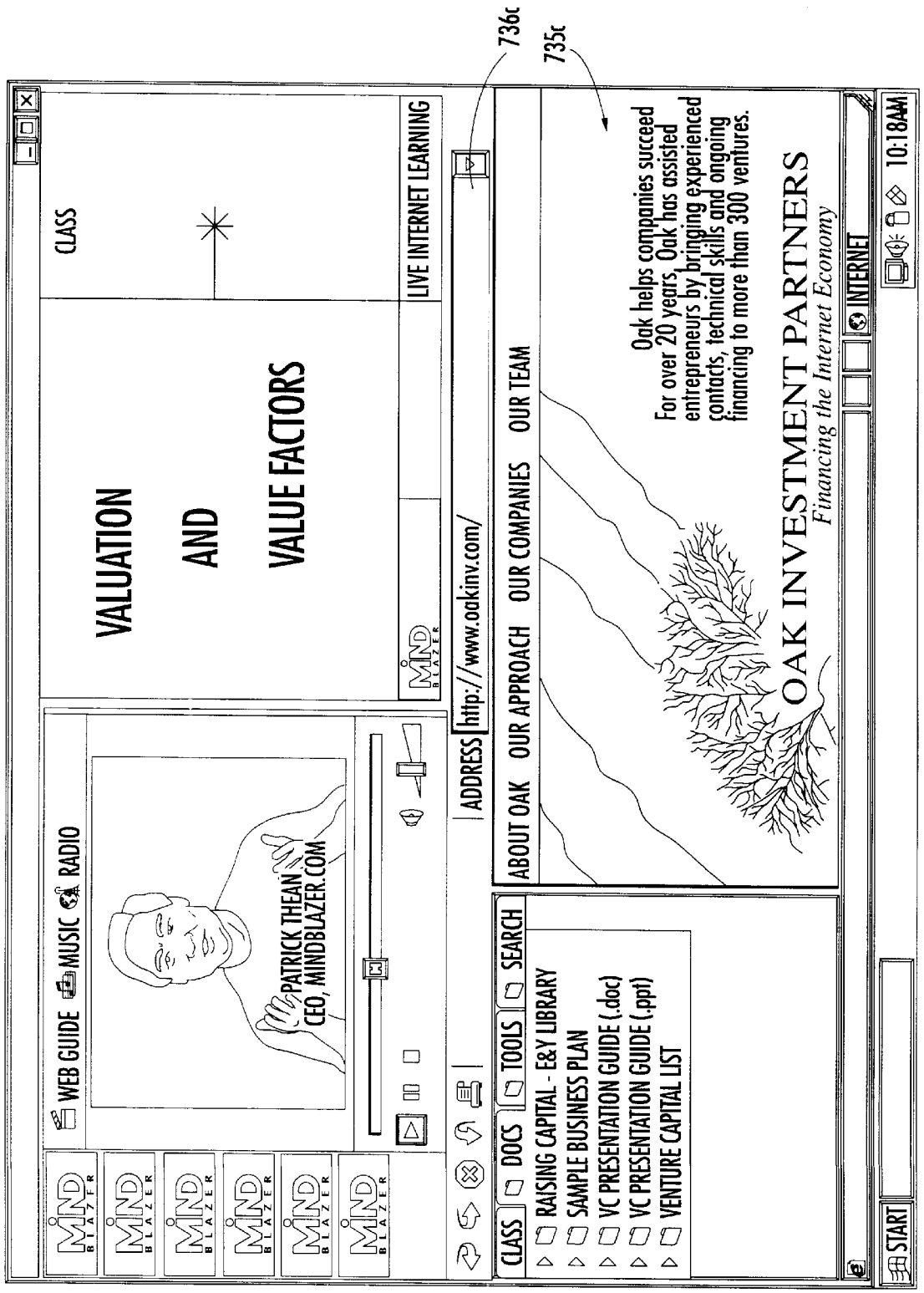
Figure 19:
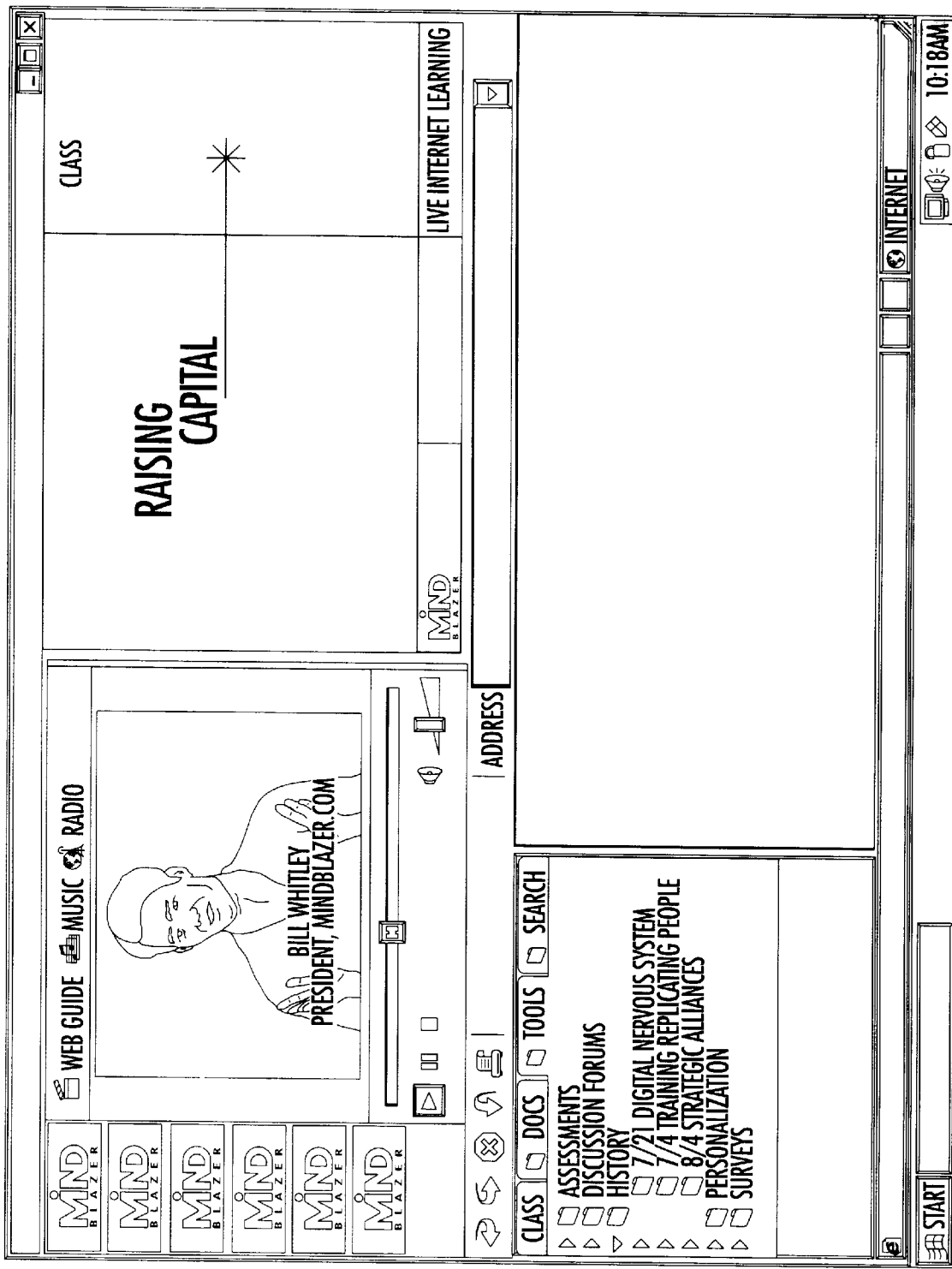

Referring to FIG. 17, the archived event from the perspective of the user of the microsite is illustrated when the user selects a particular web address to browse. In this example, the microsite user has entered a web address at 736*a*. As a result, the web page located at the entered web address is displayed at 735*b* for viewing by the user during use of the microsite. The web browser utilized to implement this component of the present invention can be any of those which are generally available in the industry. Upon selection of the "Oak Investment Partners" entry in the web page displayed at 735*b* of FIG. 17, the Oak Investment Partners web page is displayed to the user as illustrated at 735*c* of FIG. 18. Consistent with most browsers, the address in the address block changes to the address for the Oak Investment Partners web site as illustrated at 736*c* of FIG. 18.

The user of the microsite may also select the tool tab from the lower area at 734. In the example illustrated in FIG. 19, selection of the "tools" tab results in the list of a number of tools at 734*b* which the user of the microsite may select. These tools allow the user to select different "chunks" of the archived event.

Finally, the user of the microsite may desire to search the various archived events located at this particular microsite. This is accomplished by the user selecting the "search" tab illustrated at FIG. 20. Selection of this tab will present to the user a number of options at 734*c* for selecting the particular events which the user may wish to review or to even search or browse the Internet.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A collaborative learning event system, said system comprising:
    a pre-event module, said pre-event module comprising means for preparing learning materials for an event for delivery by a presenter over a backbone system to an audience located remotely from the presenter;
    an event module, said event module comprising means for delivering the event over a backbone system to the audience located remotely from the presenter; and
    a post event module, said post event module comprising means for creating follow-up training materials and for delivering the follow-up training materials to at least one of a member of the audience and an individual that is not a member of the audience.

2. A system according to claim 1 wherein said backbone system comprises a telephone network for delivering audio content of the event and a computer network for delivering visual content of the event.

3. A system according to claim 1 wherein said pre-event module further comprises means for designing the event and for optimizing the event.

4. A system according to claim 2 wherein the pre-event module further comprises means for chunking the learning materials.

5. A system according to claim 1 wherein the event delivering means comprises means for delivering streaming video and means for delivering slides.

6. A system according to claim 1 wherein the event module comprises means for delivering content for the event and delivering slides.

7. A system according to claim 1 wherein the event module comprises means for receiving questions from the audience.

8. A system according to claim 7 wherein the event further comprises means for filtering at least one question from a plurality of questions prior to the plurality of questions being received by the presenter.

9. A system according to claim 7 wherein the event module further comprises means for providing a response to the received question to at least one member of the audience.

10. A system according to claim 7 wherein the event module further comprises means for providing a response to the received question to the audience.

11. A system according to claim 1 wherein the event module comprises means for polling the audience and means for presenting results of the polling to the audience.

12. A system according to claim 7 wherein the receiving means comprises one of a telephone, web site and electronic mail.

13. A system according to claim 1 wherein said post event module further comprises means for receiving at least one response to the follow-up training materials from at least one of the audience.

14. A system according to claim 1 wherein the follow-up training materials comprise at least one of a cases study, an archived copy of the event and a document related to the event.

15. A system according to claim 14 wherein the creating means comprises means for encoding a video of the event and storing the encoded event video on a microsite.

16. A system according to claim 14 wherein the archived copy of the event is stored on a microsite and comprises at least one of an encoded video of the event, an audio version of the event, slides used during the event, and a summary of the event.

17. A system according to claim 15 wherein the creating means comprises means for creating additional documents related to the event and storing the created additional documents on a microsite in association with the encoded event video.

18. A method for conducting a collaborative learning event, said method comprising the steps of:
    preparing learning materials for an event for delivery by a presenter over a backbone system to an audience located remotely from the presenter;
    delivering the event over a backbone system to the audience located remotely from the presenter, wherein delivering the event comprises delivering the learning materials and wherein the backbone system comprises a telephone network for delivering audio content of the event and a computer network for delivering visual content of the event;
    creating follow-up training materials to the event; and
    delivering the follow-up training materials to at least one of a member of the audience and an individual that is not a member of the audience.

19. A computer program product for conducting a collaborative learning event, the computer program product comprising:
    a computer readable storage medium having computer readable code means embodied in said medium, said computer readable code means comprising:
    computer instruction means for preparing learning materials for an event for delivery by a presenter over a backbone system to an audience located remotely from the presenter;
    computer instruction means for delivering the event over a backbone system to the audience located remotely from the presenter, wherein delivering the event comprises delivering the learning materials and wherein the backbone system comprises a telephone network for delivering audio content of the event and a computer network for delivering visual content of the event;
    computer instruction means for creating follow-up training materials to the event; and
    computer instruction means for delivering the follow-up training materials to at least one of a member of the audience and an individual that is not a member of the audience.

20. A method for conducting a collaborative learning event, the method comprising the steps of:

preparing presentation materials for delivery by a presenter during a learning event over a backbone system to an audience located remotely from the presenter;

optimizing the presentation materials to be delivered by the presenter during the learning event to the audience;

providing to a facilitator located at the site located remotely from the presenter instructions relating to controlling the audience;

establishing a telephone communications connection between the presenter and the audience;

establishing a computer network connection between the presenter and the audience;

delivering presentation materials during a learning event over the computer network connection to the audience;

delivering an audible presentation during the learning event over the telephone communications connection to the audience;

receiving over one of the telephone communications connection and the computer network connection questions from the audience located remotely from the audience subsystem;

providing follow-up materials and communications to the audience subsequent to the learning event; and creating an encoded video of the event wherein the encoded video can be accessed on demand.

* * * * *